3,317,609
EPOXIDE ADDITION REACTION WITH
AMINO ALCOHOL
Sherman D. Lesesne, Georgetown, Tex., assignor to Jefferson Chemical Company, Inc., Houston, Tex., a corporation of Delaware
No Drawing. Filed May 6, 1964, Ser. No. 365,476
7 Claims. (Cl. 260—584)

This invention relates to a method for the addition of an epoxide to an alcoholic hydroxyl group. More particularly, this invention is directed to a method for the preferential addition of an epoxide to an alcoholic hydroxyl group in the presence of a reactive amino hydrogen atom. This application is a continuation-in-part of my copending application Ser. No. 88,006, filed Feb. 9, 1961, now abandoned.

It is known to react epoxides, such as ethylene oxide with ammonia or a primary or secondary amine in order to prepare an amino alcohol. In general, amino hydrogen atoms are sufficiently reactive that no catalyst is required for this reaction. Further, if more than one mol of epoxide is used per mol of amine, all of the amino hydrogen atoms will react before there is any appreciable reaction of the hydroxyl groups formed by the reaction of the epoxide with the amine. This is demonstrated by the preparation of ethanolamines by the reaction of ethylene oxide with ammonia. This is a step-wise reaction proceeding as shown by the following equations:

$NH_3 + C_2H_4O \rightarrow H_2NC_2H_4OH$
$H_2NC_2H_4OH + C_2H_4O \rightarrow HN(C_2H_4OH)_2$
$HN(C_2H_4OH)_2 + C_2H_4O \rightarrow N(C_2H_4OH)_3$
$N(C_2H_4OH)_3 + C_2H_4O \rightarrow (HOC_2H_4)_2NC_2H_4OC_2H_4OH$ The reaction of epoxides with alcoholic hydroxyl groups is also a well-known reaction. In general, this reaction does not proceed as readily as the reaction of an epoxide with an amine and catalysts are required to promote this reaction. Many examples of both basic and acidic alkoxylation catalysts are known to those skilled in the art.

In a typical reaction of an epoxide with an alcoholic hydroxyl group, about 1–10% of an alkali metal hydroxide will be employed as catalyst at a temperature of about 100° to about 150° C. and a pressure of from about 5 to about 50 p.s.i.g. However, if these conditions are employed to react an epoxide with an alcoholic hydroxyl group in the presence of an active amino hydrogen, the reaction will preferentially occur at the amine group and there will be no appreciable reaction of the hydroxyl group until the amine group is substantially completely reacted. This is illustrated in Example I wherein methylaminoethanol was reacted with ethylene oxide.

EXAMPLE I

Thirty grams of methylaminoethanol (0.4 mol) and 1.12 g. of flaked potassium hydroxide (0.02 mol) were added to a 600 ml. shaker-type autoclave. The autoclave was evacuated, flushed twice with nitrogen and 176 g. of ethylene oxide (4 mols) were added at a temperature of 120° to 127° C. and a pressure of 30 p.s.i.g. The adduct was diluted with 100 ml. of distilled water and the pH was adjusted to 10.6 with phosphoric acid. The product was then stripped at 120° C. in vacuum to remove the water and the precipitated potassium phosphate was removed by filtration. The product had a total amine content of 1.92 meq./g. and a tertiary amine content of 1.91 meq./g. corresponding to about 99.5% of the total amine.

It can thus be seen that when an attempt was made to react ethylene oxide with an alcoholic hydroxyl group in the presence of an active amino hydrogen atom, using normal ethoxylation conditions, the amine group was substantially completely reacted.

I have now surprisingly discovered that an epoxide may be made to react preferentially with an alcoholic hydroxyl group of a secondary amino alcohol containing a reactive amino hydrogen at a temperature of at least about 50° C. in the presence of a Group I metal or amide or hydride thereof, the Group I metal or amide or hydride thereof being present in an amount sufficient to provide at least about one mol equivalent of Group I metal or amide or hydride thereof per mol equivalent of hydroxyl groups in the reaction mixture. Thus, for example, using butylaminoethanol and ethylene oxide, the reaction would proceed along the following lines:

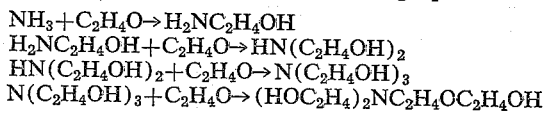

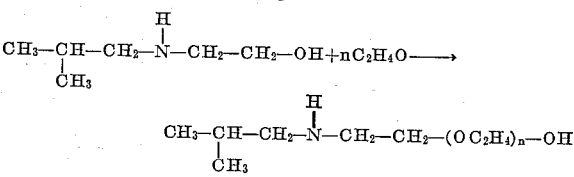

The amino alcohol starting materials for the present invention are secondary amino alcohols having the following formula:

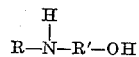

wherein R is selected from the class consisting of $C_1$–$C_{18}$ non-tertiary alkyl, alkenyl, aryl, aralkyl and alkylaryl and R' is selected from the class consisting of $C_2$–$C_{12}$ alkylene and arylalkylene. The preferred starting materials are those wherein R is a non-tertiary $C_1$–$C_4$ alkyl group and R' is a $C_2$–$C_4$ alkylene group. The present process may also be employed when R is a tertiary group; however, tertiary groups, especially large tertiary groups, reduce the reactivity of the amino hydrogen to such an extent that epoxides may be reacted with the alcoholic hydroxyl group using normal alkoxylation procedures.

Secondary amino alcohols corresponding to the above formula may be prepared by any suitable means such as, for example, the non-catalytic addition of one mol of a $C_2$–$C_{12}$ alkylene oxide to a primary amine. Suitable secondary amino alcohols include, for example, methylaminoethanol, ethylaminoethanol, n-butylaminoethanol, isobutylaminoethanol, octylaminoethanol, octadecylaminoethanol, cyclohexylaminoethanol, phenylaminoethanol, naphthylaminoethanol, phenethylaminoethanol and the corresponding secondary amino alcohols from propylene oxide, butylene oxide, dodecene oxide, styrene oxide, etc.

The epoxide employed may be either a monoepoxide or a diepoxide. Suitable monoepoxides are those having the formula:

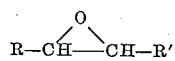

wherein R and R' are selected from the class consisting of hydrogen, $C_1$–$C_{18}$ alkyl, $C_1$–$C_4$ haloalkyl and phenyl. Those epoxides wherein at least one of R and R' are hydrogen, that is, terminal epoxides, have been observed to be particularly effective. Samples of suitable monoepoxides include ethylene oxide, propylene oxide, 1,2-butylene oxide, dodecene oxide, styrene oxide, epichlorohydrin, 2,3-butylene oxide and mixtures thereof.

The diepoxide may be one in which the epoxide groups are adjacent to one another or in which the epoxide groups are separated by alkyl or aryl groups. Examples of suitable diepoxides include butadiene diepoxide, vinylcyclohexene diepoxide, divinylbenzene diepoxide and epoxy terminated polymers such as those obtained by the reaction of epichlorohydrin with a bisphenol.

The preferred epoxides for my process are ethylene oxide, propylene oxide and 1,2-butylene oxide.

The mol ratio of secondary amino alcohol to alkylene oxide may be varied as desired to get any desired molecular weight. Thus, from about 1 to 1,000 mols of epoxide may be used for each mol of secondary amino alcohol to provide products having a molecular weight of from about 120 to about 300,000 depending upon whether a monoether or a polyether is desired.

The catalyst to be employed is a Group I metal or hydride or amide thereof, such as sodium, sodium hydride, sodium amide, potassium, potassium hydride, potassium amide, lithium, lithium hydride, lithium amide and the corresponding rhodium and cesium metals or hydrides or amides thereof. It will be understood that an alloy of two or more Group I metals or a mixture of two or more hydrides or amides thereof may also be used as desired.

As evidenced by the results in Example IV, the amount of catalyst employed is critical. In general, it is preferable to utilize at least about one mol of Group I metal or compound thereof per mol equivalent of hydroxyl groups in the secondary amino alcohol. Thus, for example, from about 0.8 to about 2 mols of Group I metal or compound thereof may be used per mol equivalent of hydroxyl groups in the secondary amino alcohol. More preferably, from tbout 1 to about 1.5 mol equivalents of Group I metal, hydride or amide thereof, are used per mol equivalent of hydroxyl group and still more preferably, about 1.3 mol equivalents of Group I metal, hydride or amide thereof, are used per mol equivalent of hydroxyl group of the secondary amino alcohol. If less than about 0.8 mol of catalyst per mol equivalent of hydroxyl group is employed, the yield of desired product is poor.

The temperature to be utilized should be at least about 50° C., such as the temperature within the range of 50° to about 250° C. Still more preferably, and for the best results, the temperature will be within the range of about 70° to 200° C. The higher temperatures favor the reaction of the hydroxyl group and result in higher yields of the desired product. This is shown in Example III. The reaction may be conducted at atmospheric or super-atmospheric pressure, such as the pressure within the range of about 0 to 500 p.s.i.g. and more preferably, within the range of about 0 to 100 p.s.i.g.

The alkylene oxide may be employed in either the gaseous or liquid phase, depending upon the reaction conditions. It is desirable to have the secondary amino alcohol in liquid phase. Accordingly, in situations where the secondary amino alcohol has a melting point above the reaction temperature to be employed it may be desirable to employ a suitable non-reactive solvent for the secondary amino alcohol. The identity of the solvent is not critical. Any of the conventional solvents which are not reactive with the Group I metal catalyst may be employed. Representative examples of such solvents include the polyethers such as diethylene glycol dimethyl ether or ethylene glycol dimethyl ether.

The invention will be further illustrated by the following specific examples:

EXAMPLE II

*Addition of ethylene oxide to 2-isobutylaminoethanol*

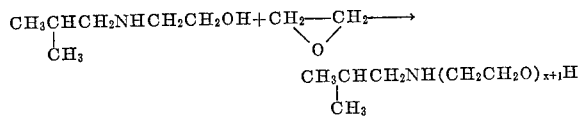

Twenty-three and four-tenths grams of 2-isobutylaminoethanol (0.2 mol), 5.0 grams of sodium (0.22 mol), and 100 ml. of diethylene glycol dimethyl ether (used as a solvent) were placed in a one-liter, three-neck flask in an atmosphere of nitrogen. The flask was equipped with a stirrer, thermometer and a Dry Ice reflux condenser. The mixture was stirred at 140° C. for 30 minutes. Seventy-seven grams of ethylene oxide were added over a period of one hour at 140° to 145° C. and at atmospheric pressure.

The catalyst was neutralized with 10 grams of phosphoric acid in 100 ml. of water. Water and solvent were removed by distillation, stripping at 160° C. under vacuum. The resulting precipitate of sodium phosphate was removed by filtration. The adduct was a light straw-colored liquid with a neutralization equivalent (N.E.) of 529 (theory 500). The secondary amine analysis showed 88%.

Using the same reaction conditions described above, ethylene oxide was added to the following secondary amino alcohols: 2-phenylaminoethanol, 2-methylaminoethanol, and diethanolamine. The respective secondary amine analyses of the products gave 86%, 65% and 94%.

Other epoxides may be substituted for ethylene oxide in the above-described experiments with similar results.

EXAMPLE III

*Effect of temperature*

Example I was repeated, but the reaction temperature was held at about 40° C. and about 7.5 grams of sodium were employed (equivalent ratio of sodium to amino alcohol of 1.5 to 1), and formation of a polyether secondary amino alcohol did not occur. Under the same conditions, except for a temperature of about 100° C., the yield of polyether secondary amino alcohol was 77%. When the reaction temperature was raised to 150° C. and the example was otherwise repeated, the yield was 88%.

EXAMPLE IV

*Mol ratio of catalyst to alcohol*

Twenty-three and four-tenths grams of 2-isobutylaminoethanol (0.2 mol), about 3.5 grams of sodium (0.13 mol) and 100 ml. of diethylene glycol dimethyl ether were placed in a flask in an atmosphere of nitrogen, the flask being equipped with a stirrer, thermometer and Dry Ice reflux condenser. The mixture was reacted at about 100° C. for about 30 minutes and then about 77 grams of ethylene oxide were added over a one-hour period at atmospheric pressure and a temperature of about 100° C.

At the end of this time the catalyst was neutralized with phosphoric acid, and water and solvent were stripped under vacuum. The yield of secondary amine product was 32%. When an equimolar amount of sodium was employed and the example was otherwise repeated the yield of secondary amine was 51%. When the amount of sodium was increased to provide a mol ratio of about 1.3 sodium per mol of 2-isobutylaminoethanol, the yield was increased to 75%.

I claim:

1. A method for the preferential reaction of an epoxide with an alcoholic hydroxyl group of a secondary amino alcohol containing a reactive amino hydrogen and having the formula

wherein R is selected from the class consisting of $C_1$–$C_{18}$ primary and secondary alkyl, alkenyl, aryl, aralkyl and alkylaryl and R' is selected from the class consisting of $C_2$–$C_{12}$ alkylene and arylalkylene which comprises treating the amino alcohol with the epoxide at a temperature of at least about 50° C. and a pressure within the range of about 0 to 500 p.s.i.g. in the presence of a catalyst selected from the class consisting of Group I metals, Group I metal hydrides and Group I metal amides, from about 0.8 to about 2 mols of catalyst being employed per mol equivalent of hydroxyl groups in the amino alcohol.

2. A method as in claim 1 wherein the epoxide is selected from the group consisting of ethylene oxide, propylene oxide, 1,2-butylene oxide and mixtures thereof.

3. A method as in claim 2 wherein the temperature is within the range of about 70° to about 200° C., the pressure is within the range of about 0 to about 100 p.s.i.g. and the catalyst is present in an amount of about 1 to about 1.5 mols per mol equivalent of hydroxyl groups in the secondary amino alcohol.

4. A method as in claim 3 wherein R is selected from the class consisting of $C_1$–$C_4$ primary and secondary alkyl groups, R' is a $C_2$–$C_4$ alkylene group and the alkylene oxide is ethylene oxide.

5. A method as in claim 4 wherein the alkylene oxide is propylene oxide.

6. A method as in claim 3 wherein R is phenyl, R' is a $C_2$–$C_4$ alkylene group and the alkylene oxide is ethylene oxide.

7. A method as in claim 6 wherein the alkylene oxide is propylene oxide.

References Cited by the Examiner
UNITED STATES PATENTS

| | | | |
|---|---|---|---|
| 1,970,578 | 8/1934 | Schoeller | 260—584 X |
| 2,871,266 | 1/1959 | Riley | 260—584 |
| 3,030,426 | 4/1962 | Moseley | 260—570.7 X |
| 3,118,000 | 1/1964 | Dupre | 260—584 |
| 3,161,682 | 12/1964 | Lesesne et al. | 260—584 |

CHARLES B. PARKER, *Primary Examiner.*

RICHARD L. RAYMOND, *Assistant Examiner.*